United States Patent
Ghyme et al.

(10) Patent No.: US 9,076,345 B2
(45) Date of Patent: Jul. 7, 2015

(54) APPARATUS AND METHOD FOR TUTORING IN CONVERGENCE SPACE OF REAL AND VIRTUAL ENVIRONMENT

(75) Inventors: Sang Won Ghyme, Daejeon (KR); Sanghyun Joo, Daejeon (KR); Jaehwan Kim, Daejeon (KR); Hyo Taeg Jung, Daejeon (KR); Il Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 114 days.

(21) Appl. No.: 13/439,809

(22) Filed: Apr. 4, 2012

(65) Prior Publication Data

US 2012/0251995 A1 Oct. 4, 2012

(30) Foreign Application Priority Data

Apr. 4, 2011 (KR) ........................ 10-2011-0030756

(51) Int. Cl.
*G09B 5/06* (2006.01)
*G06T 13/40* (2011.01)

(52) U.S. Cl.
CPC ........................................ *G09B 5/06* (2013.01)

(58) Field of Classification Search
CPC .................................................... G06T 19/006
USPC ......................................................... 434/362
See application file for complete search history.

(56) References Cited

U.S. PATENT DOCUMENTS

| | | | |
|---|---|---|---|
| 7,212,664 B2* | 5/2007 | Lee et al. ........................ | 382/154 |
| 7,834,846 B1 | 11/2010 | Bell | |
| 7,945,856 B2 | 5/2011 | Leahy et al. | |
| 2003/0146922 A1* | 8/2003 | Navab et al. .................... | 345/633 |
| 2004/0104935 A1* | 6/2004 | Williamson et al. ........... | 345/757 |
| 2005/0219391 A1* | 10/2005 | Sun et al. ....................... | 348/255 |
| 2008/0013793 A1* | 1/2008 | Hillis et al. .................... | 382/114 |

(Continued)

FOREIGN PATENT DOCUMENTS

| | | |
|---|---|---|
| JP | 2009-145883 A | 7/2009 |
| KR | 1020090117531 A | 11/2009 |

(Continued)

OTHER PUBLICATIONS

Wikipedia: Structure From Motion, Web Archive, Feb. 5, 2010. <https://web.archive.org/web/20100205070100/http://en.wikipedia.org/wiki/Structure_from_motion>.*

Naoki Hashimoto et al., "Dynamic Luminance Correction for Colored Surfaces", Jul. 25-29, 2010, Siggraph, Los Angeles, California.

*Primary Examiner* — Sam Yao
*Assistant Examiner* — Thomas Hong (57) ABSTRACT

An apparatus for tutoring in a convergence space of real and virtual environment, includes a character data processing unit for generating character shape and operation data of a participant or performing rendering on the character shape and operation data; a desk data processing unit for generating desk shape data or perform the rendering on the desk shape data; a voice and sound data processing unit for generating voice or sound data or outputs the voice or sound data; and a virtual space processing unit for generating real space data and providing the generated data to another participant, generating the convergence space data, or generating the character shape data, the operation data, the desk shape data, and the voice or sound data, then providing the generated data to the character data processing unit, the desk data processing unit, and the voice and sound data processing unit.

14 Claims, 4 Drawing Sheets

(56) References Cited

U.S. PATENT DOCUMENTS

| | | | |
|---|---|---|---|
| 2008/0268418 A1* | 10/2008 | Tashner et al. | 434/365 |
| 2009/0009513 A1* | 1/2009 | van den Hengel et al. | 345/420 |
| 2009/0128552 A1* | 5/2009 | Fujiki et al. | 345/419 |
| 2010/0159430 A1 | 6/2010 | Lee et al. | |
| 2010/0253700 A1* | 10/2010 | Bergeron | 345/633 |

FOREIGN PATENT DOCUMENTS

| | | |
|---|---|---|
| KR | 1020100073076 A | 7/2010 |
| KR | 1020100118943 A | 11/2010 |

* cited by examiner

APPARATUS AND METHOD FOR TUTORING IN CONVERGENCE SPACE OF REAL AND VIRTUAL ENVIRONMENT

CROSS-REFERENCE TO RELATED APPLICATION(S)

The present invention claims priority of Korean Patent Application No. 10-2011-0030756, filed on Apr. 4, 2011, which is incorporated herein by reference.

FIELD OF THE INVENTION

The present invention relates to a tutoring system; and more particularly, to an apparatus and a method for tutoring in a convergence space of real and virtual environment capable of saving cost of a tutor and a learner by using simpler and more inexpensive equipment that is not attached to a user's body, to prevent a use of expensive equipment and equipment attached to a user increasing a user's fatigue that are main disadvantages of a tutoring method using virtual reality and an augmented reality.

BACKGROUND OF THE INVENTION

Recently, a visiting education market for pre/post school children has been rapidly grown. This type of education has advantage in teaching materials and direct guidance of a tutor, but causes an increase in cost since the tutor directly visits a home. The visiting education has problems of high costs, invasion of privacy due to a home visit, a limitation of the number of educable learners per a tutor due to the time taken to visit a house, and difficulty in objective management of a tutoring method of a tutor.

As alternatives of the disadvantages of the visiting education, tutoring methods using telephone or TV broadcasting has emerged. However, theses methods partially relinquish the advantages of the direct guidance of the visiting education so that they cannot be perfect alternatives.

With the development of a communication technology such as Internet, tutoring using remote video communication has been expected as alternatives for solving many disadvantages while maintaining the advantages of the visiting education. The remote video tutoring is a type of transmitting and receiving only visual and auditory information by a scheme of acquiring information using a camera and a mike and playing the acquired information by a display and a speaker. Therefore, the remote video tutoring can perform only limited interaction depending on the visual and auditory information.

Recently, a new tutoring scheme using the virtual reality or the augmented reality providing more interaction between the tutor and the learner has emerged. The new tutoring scheme uses an advanced technology of using three-dimensional modeling and rendering, recognizing a user's gesture, and adding virtual additional information to a real image to increase immersion in tutoring of a learner.

At the early stage, the new tutoring method using the virtual reality or the augmented reality depends on the virtual space that may be more easily handled, rather than on the real space that may not be easily handled and concentrates on the indirect interaction by the user's gesture rather than on the direct interaction. Further, the new tutoring method has various problems such as requiring high expensive apparatuses such as a see-through head mounting display (HMD), increasing in a user's fatigue due to apparatuses attached to a body, or the like.

As described above, the visiting education, the remote video tutoring, and the tutoring using the virtual reality and the augmented reality has advantages and disadvantages. In terms of the learner, the visiting education that can perform the direct guidance is preferred but may invade the privacy. In terms of the tutor, the remote video tutoring capable of performing more various guidances and objective tutoring management without wasting the time taken to visit the learner is preferred but may increase user charging due to the limited interaction and the equipment installation. The recent tutoring method using the virtual reality or the augmented reality extends the interaction range and provides various effects further increasing the immersion in tutoring but has a big burden about the use of expensive apparatuses.

SUMMARY OF THE INVENTION

In view of the above, the present invention provides an apparatus and a method for tutoring in a convergence space of real and virtual environment capable of saving cost of a tutor and a learner by using simpler and more inexpensive equipment that is not attached to a user's body, to prevent a use of expensive equipment and equipment attached to a user increasing a user's fatigue that are main disadvantages of a tutoring method using virtual reality and an augmented reality.

Further, the present invention provides an apparatus and a method for tutoring in a convergence space of real and virtual environment capable of improving satisfaction of a learner by virtualizing a real space of a tutor and a learner, providing a convergence space in which the real space and an opponent's virtualized real space are synchronized with each other, and replacing the virtualized tutor into an famous actor or cartoon character so as to implement remote video tutoring that has advantages of overcoming a spatial and temporal limitation.

Further, the present invention provides an apparatus and a method for tutoring in a convergence space of real and virtual environment capable of increasing immersion in a learner by performing more direct interaction through spatial information to overcome limited interaction depending on only virtual and auditory information that are main disadvantages of a remote video tutoring.

Objects of the embodiment of the present invention are not limited the above-mentioned objects and other objects may be apparently understood to a person skilled in the art to which the present invention pertains from the following description.

In accordance with a first aspect of the present invention, there is provided an apparatus for tutoring in a convergence space, including: a character data processing unit configured to generate character shape and operation data of a participant by capturing a character image of the participant or perform rendering on the character shape and operation data within the convergence space provided from the outside; a desk data processing unit configured to generate desk shape data by capturing a desk of the participant or perform the rendering on the desk shape data within the convergence space provided from the outside; a voice and sound data processing unit configured to generate voice or sound data based on voice or sound generated under the environment that the participant receives a tutoring service or outputs the voice or sound data within the convergence space provided from the outside; and a virtual space processing unit configured to generate real space data virtualized by using the character shape data, the operation data, the desk shape data, and the voice or sound data and provide the generated data to another participant through a communication network, generate the convergence space data based on the virtualized real space data and the generated virtualized real space data received from another participant, or generate the character shape data, the operation data, the desk shape data, and the voice or sound data within the convergence space from the convergence space data and then, provide the generated data to the character data processing unit, the desk data processing unit, and the voice and sound data processing unit.

In accordance with a second aspect of the present invention, there is provided a method for tutoring in a convergence space, including: generating character shape and operation data of a participant by capturing a character image of the participant; generating desk shape data based on an image obtained by capturing a desk of the participant;

generating voice or sound data based on voice or sound generated under the environment that the participant receives a tutoring service; generating virtualized real space data by using the character shape data, the operation data, the desk shape data, and the voice or sound data of the participant and providing the generated virtualized real space data to another participant through a communication network; generating convergence space data based on the virtualized real space data and the generated virtualized real space data that are received from another participant; and generating the character shape data, the operation data, the desk shape data, and the voice or sound data within the convergence space from the convergence space data and then, providing the generated data through each of the output devices.

In accordance with an embodiment of the present invention, it is possible to improve the satisfaction of the learner by transforming the tutor virtualized in the convergence space into other characters and enable the transformed tutor to guide the learner.

Further, it is possible to implement the direct interaction by performing operations such as taking a note on the real teaching materials in the convergence space, deforming or replacing the real teaching materials, or the like, thereby increasing the immersion in the learner.

Further, it is possible to increase the tutoring efficiency while providing safety and reality by performing the science experiment having a large risk using a safe wood tool but shows the wood tool like the actual tool.

Further, it is possible to save the cost of the tutor and the learner by using simpler and inexpensive equipment that is not attached to a user's body, to prevent a use of expensive equipment and equipment attached to a user increasing the user's fatigue that are main disadvantages of a the tutoring method using the virtual reality and augmented reality technology in accordance with the related art.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, a system and a method for tutoring in a convergence space in accordance with embodiments of the present invention will be described in detail with reference to the accompanying drawings which form a part hereof.

Figure 1A:
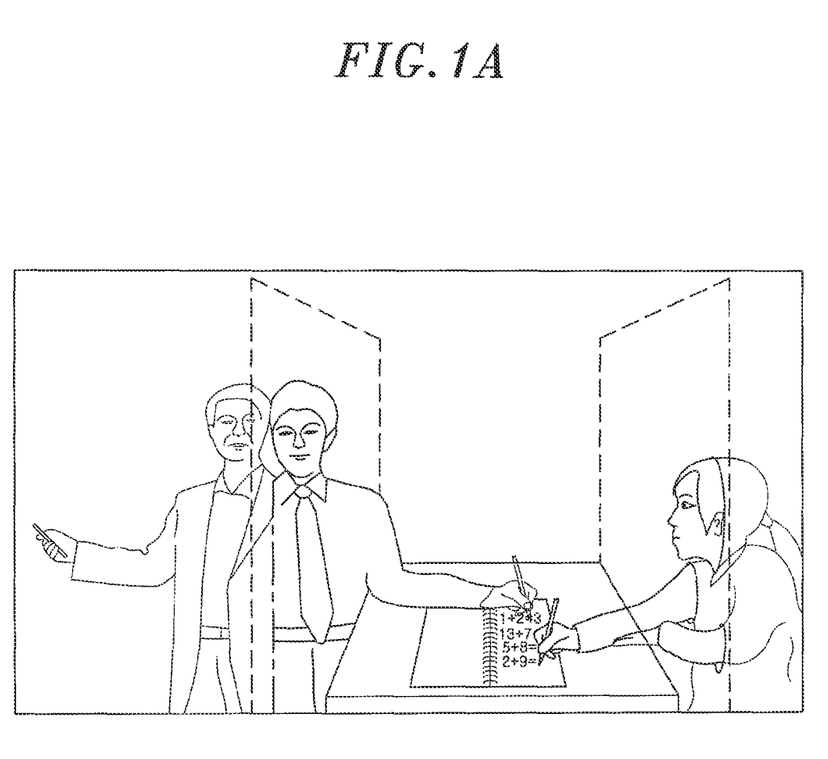
FIGS. 1A to 1C are conceptual diagrams for describing a system and a method for tutoring in a convergence space of real and virtual environment in accordance with an embodiment of the present invention.
Figure 1B:
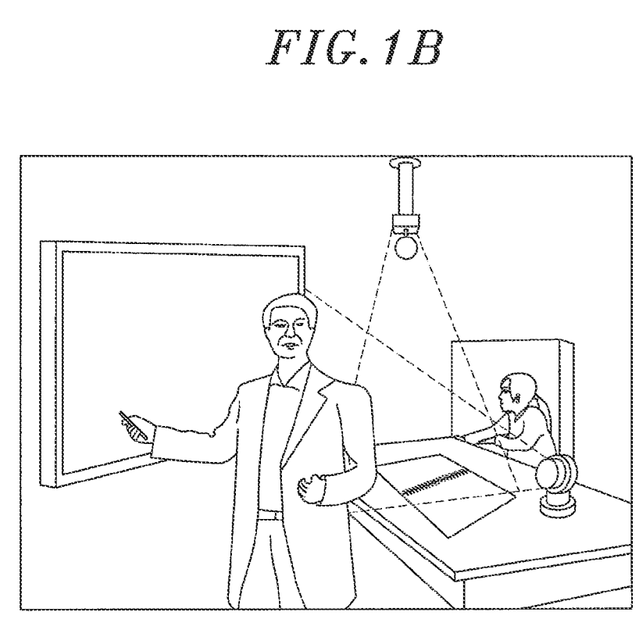
Figure 1C:
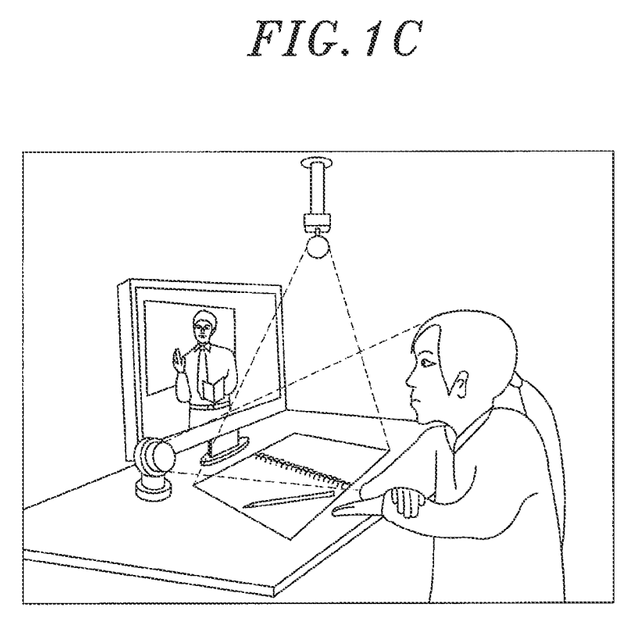

FIGS. 1A to 1C are conceptual diagrams for describing a system and a method for tutoring in a convergence space of real and virtual environment in accordance with an embodiment of the present invention. A tutor and a learner are present in each real space as illustrated in FIGS. 1B and 1C, but tutoring is performed in the convergence space by a system for tutoring in the convergence space as illustrated in FIG. 1A.

Figure 2:
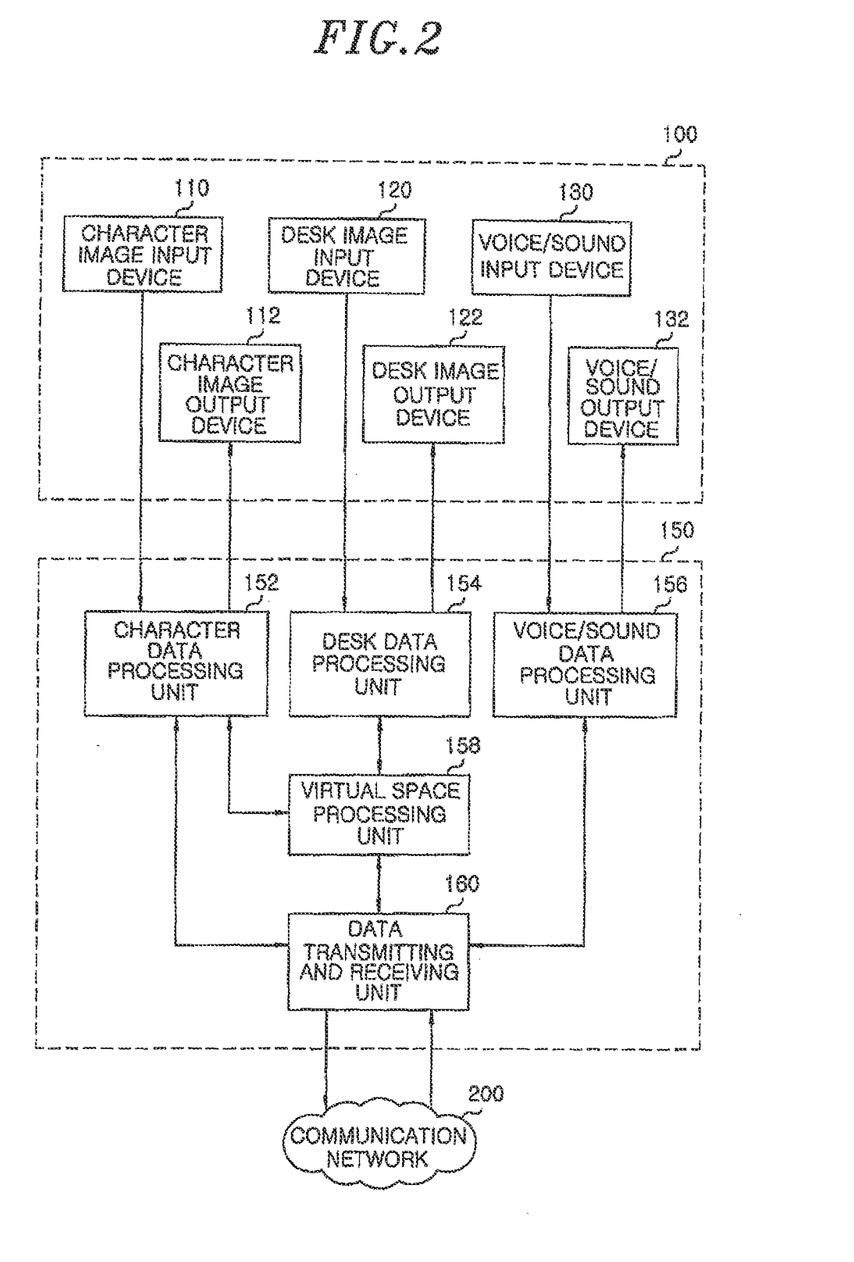
FIG. 2 is a block diagram illustrating a system for tutoring in a convergence space of real and virtual environment in accordance with an embodiment of the present invention.

FIG. 2 is a block diagram illustrating a system for tutoring in a convergence space of real and virtual environment in accordance with an embodiment of the present invention. The system for tutoring in a convergence space of real and virtual environment includes an information processing device 100 that processes information in a real world, terminal device 150 that transmits and receives data required for tutoring by communication with a plurality of terminal devices through a communication network 200, and the like. In this configuration, the terminal device 150 includes a processing device that provides tutoring services in a convergence space. The processing device may be installed in a program type. The terminal device 150 includes a character data processing unit 152, a desk data processing unit 154, a voice/sound data processing unit 150, a virtual space processing unit 158, and a data transmitting and receiving unit 160, and the like.

In this configuration, the information processing device 100 includes a camera set that captures images, a mike that records auditory information, a display device that displays visual information, a speaker that represents the auditory information, and a projector that controls spatial information, and the like. That is, the information processing device 100 includes character input/output devices 110 and 112, desk image input and output devices 120 and 122, voice/sound input and output devices 130 and 132 and the like. In this configuration, the character image input device 110 and the desk image input device 120 may be implemented by a camera set, the character image output device 112 and the desk image output device 122 may be implemented by the display device and a projector, the voice/sound input device 130 may be implemented by the mike, and the voice/sound output device 132 may be implemented by the speaker.

The character image input device 110 captures a figure of a participant in a real world and then, provides the captured figure of a character to the terminal device 150. That is, a figure of a tutor or a learner is captured three-dimensionally by using the camera set including at least one camera and then, the captured image is provided to the terminal device 150. Therefore, the terminal device 150 processes the image captured by driving the character data processing unit 152 to generate a three-dimensional shape and operation of a tutor, that is, character shape data and character operation data and then, output them to the character image output device 112.

The desk image input device 120 provides an image capturing a desk for instruction of learning to the terminal device 150 and the desk image output device 122 displays the spatial information of the desk. In this case, the desk serves as a convergence space in which the actual guidance between the tutor and the learner is performed and each real space of the tutor and the learner is synchronized with each other and the spatial information of the desk is processed by a desk data processing unit 154.

The voice/sound input device 130 records a voice of a character that is a participant and other sounds and then, provides the recorded voice and sounds to the voice/sound data processing unit 156 of the terminal device 150 and the voice/sound output device 132 outputs and represents the voice and sound of the character. The learner and the tutor accessing the system for tutoring in the convergence space using the voice/sound input and output devices 130 and 132 may have a conversation with each other through a voice.

As described above, a control of the voice/sound input and output devices 130 and 132 may be performed by a voice/sound data processing unit 156 of the terminal device 150.

An example of the terminal device 150 includes a unit which may control a camera set that captures visual information of the real spaces for the tutor and the learner, respectively, a mike that records the auditory information, a display that displays opponent's visual information, a speaker that represents the auditory information, a desk for instruction of learning, a camera set that captures the desk, and a projector that controls the spatial information of the desk and transmit and receive the visual, auditory, and spatial information among them.

The character data processing unit 152 receives and processes the image, that is, the three-dimensional character shape data and the operation data from the character image input device 110 and provides the processed data to the virtual space processing unit 158 and display the three-dimensional shape and operation data within the convergence space provided from the virtual space processing unit 158 through the character shape output device 112.

In other words, the character data processing unit 152 receives the character image from the character image input device 110 to generate the three-dimensional character shape and operation data and fuses the three-dimensional operation and shape data provided from other terminal devices connected through a communication network 200 and the generated three-dimensional character shape and operation data and displays the fused data on the character image output device 112. Therefore, the character image output device 112 interworks the character data processing unit 152 to receive and output the three-dimensional character shape and operation data of the learner and the tutor.

Further, a method of allowing the character data processing unit 152 of the terminal device 150 to generate the three-dimensional shape data and character operation data from the character image (captured image) may use a Structured From Motion method at the time of using one camera to generate the three-dimensional shape and then, analyzes a configured deformable object from three-dimensional shape continuously changed by the operation of the character and uses a Stereo-Matching method at the time of using two cameras to generate the three-dimensional shape and then, analyzes the deformable object to generate the operation data.

Further, the character data processing unit 152 refers to the three-dimensional character shape and operation of the generated tutor or learner to transform the displayed figure of the character into a character preferred by the tutor or the learner, for example, a figure of an entertainer or a character. The three-dimensional operation and shape data may be displayed through the character image output device 112.

That is, the character data processing unit 152 outputs the real image of the tutor to the terminal device 150 of the learner as it is when processing the three-dimensional character shape and operation data extracted from the convergence space data or generate the three-dimensional character shape data and the character operation data of the replacement character operated like the tutor by referring to the three-dimensional character shape and operation data in the virtualized real space data when replacing the real image of the tutor with a preferred entertainer or character and performs rendering on the generated three-dimensional character shape data and operation data to output the rendered data to the character image output device 112.

In accordance with the embodiment of the present invention, the figure of the tutor displayed through the display of the learner by referring to the three-dimensional character shape and operation of the generated tutor is transformed into another entertainer or character that is preferred by the tutor and the transformed tutor can perform the instruction of learning, thereby increasing degrees of immersion of the learner.

The desk data processing unit 154 uses the desk image input device 120 to generate the desk shape data corresponding to the desk space information through the desk capturing and provide the generated desk shape data to the virtual space processing unit 158 and perform the rendering on the desk shape data within the convergence space provided from the virtual space processing unit 158 to output the rendered desk shape data to the desk image output device 122. In other words, the desk data processing unit 154 generates the desk shape data through the desk capturing of the desk image input device 120 or output the desk shape data within the convergence space provided from the virtual space processing unit 158 to the desk image output device 122 to perform the rendering thereon. As described above, the real spaces that the actual guidance is performed through sharing the desk shape data of the learner and the tutor may be synchronized with one another.

For example, when the tutor arranges the teaching materials for the tutor on the desk and the learner arranges delivered workbooks on the desk, the images of the shapes of the teaching materials and workbooks arranged on each desk that are captured by the camera set are transmitted to the opponent and the desk image transmitted from the opponent may project their own desk through the projector to share the shape of the mutual desks.

In addition, contents written on their own teaching materials by pens in the desk may be confirmed in the opponent desk and contents written on the opponent's virtual teaching materials displayed in the desk is also reflected on the opponent's desk by using the augmented reality technology to be written on the opponent's teaching materials, thereby representing the augmented information. In this case, the augmented reality technology does not refer to a technology of overlaying additional information (e.g., sight, shop name, position, or the like) to the captured image but refer to a technology of adding information by projecting specific image on an object by making the real object observed with the naked eye a canvas.

Further, contents written on their own teaching materials by using the luminance correction based diminished reality technology in the desk are reflected to the opponent by an erasing function of their own or the opponent and they projects colors replaced with a background for a portion erased from the image capturing their own desk by their own projector to disappear the contents written by them in the real space and hide the contents. In this case, the diminished reality technology refer to a technology of erasing the specific object from the image captured by the camera and filling the surroundings with a background color to disappear on the display device and hide the objects not to be observed with the naked eye. In order to display the same image on a white screen introduced in a paper "Dynamic Luminance Correction for Colored Surface" published in SIGGRAPH 2010 and an irregular surface configured of various colors, the diminished reality technology projects the luminance corrected image on the real object observed with the naked eye by using the luminance correction technology correcting the image to be projected by referring to the image capturing the projected surface by the camera to display the desired image color instead of an original color, thereby simultaneously hiding an object and a shadow.

The embodiment of the present invention may use the augmented reality technology and the diminished reality technology rather than using the existing interaction method of indirectly controlling the virtual reality through the image captured by the camera performs the operation while seeing the real object with the naked eye and may use the direct interaction method capable of performing the operation of drawing the contents on the actual object, erasing the drawn contents, hiding the real object, or replacing an object with another object. For example, contents written on their own teaching materials by using the luminance compensation based diminished reality technology in the desk are sends the erased figure to the opponent using the erasing function by them or the opponent and they projects colors replaced with a background for a portion erased from the image capturing their own desk through their own projector to hide the contents written by them in the real space and hide the contents.

In addition, the embodiments of the present invention uses tools actually made of the wood in the science experiment having a large risk but analyzes the image input from the camera set capturing the desk to project the image like the real tool by the projector and looks like the real tool even though the wood tool is used, thereby increasing the experiment having high safety and reality.

In accordance with the embodiment of the present invention, it is possible to increase the direct interaction between the tutor and the learner by deforming or replacing teaching materials or accessories for other educations using the augmented reality technology and the diminished reality technology.

The voice/sound data processing unit 156 may receive and processes the voice/sound data from the voice/sound input device 130 and transmit the processed voice/sound data to the opponent's terminal device and may process the voice/sound information transmitted from the opponent's terminal device and then, output the results through the voice/sound output device 132.

The virtual space processing unit 158 generates the real space data virtualized based on the three-dimensional character shape data, the operation data, the desk shape data, and the voice/sound data and then, transmit the generated real space data to the opponent's terminal device connected with the communication network 200 through a data transmitting and receiving unit 160.

Further, the virtual space processing unit 158 receives the opponent's virtualized real space data and its own virtualized real space data received from the opponent's terminal device to generate the convergence space data and extract the character shape and operation data, the desk shape data, and the voice or sound data to be output within the convergence space by using the convergence space data and then, transmit the extracted data to the character data processing unit 152, the desk data processing unit 154, and the voice/sound data processing unit 156, respectively.

In other words, the virtual space processing unit 158 collects the desk shape data of the learner and the tutor and then, newly generates the desk shape data based on the collected data when processing the convergence space data or performs the deforming operation on the desk shape data of the learner or the tutor to generate the desk shape data to be finally reflected and then, transmit the generated data to the desk data processing unit 154. Therefore, the desk data processing unit 154 renders the desk image data that is a final image to be output to the desk by performing the augmented or diminished processing process on the desk shaped to be finally reflected and outputs the rendered data to the desk image output device 122.

In addition, the virtual space processing unit 158 transforms the operation data of a sign language into the voice information when the operation data recognized as sign language contents according to the hand and arm operations of a participant are received, even though one of the tutor and the learner entering the convergence space losses the auditory function and have a conversation with the sign language and another participant does not know the sign language. The transformed voice information is output through the voice/sound data processing unit 156 and the voice/sound output device 132.

Further, the voice contents of another participant is changed and output into the sign language contents and therefore, it is possible to provide a natural conversation with the opponent having other body conditions (like the physically handicapped) in the convergence space.

The data transmitting and receiving unit 160 is connected with a plurality of terminal devices through the communication network 200 and transmits the virtualized real space data generated in the virtual space processing unit 158 to the opponent terminal device or receive the virtualized real space data from the opponent terminal device and transmit the received real space data to the virtual space processing unit 158.

Figure 3:
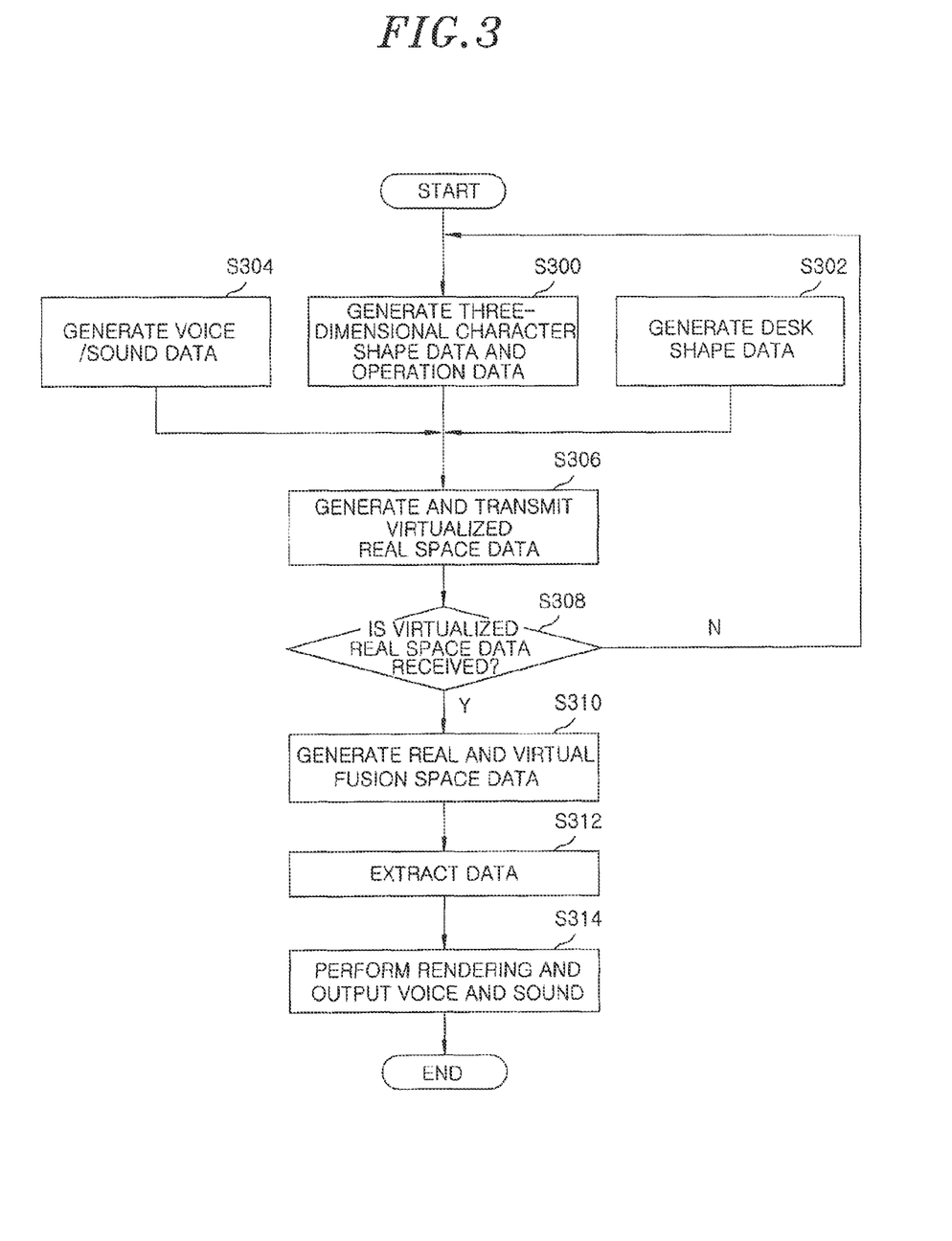
FIG. 3 is a conceptual diagram for describing a method for providing a tutoring service in a convergence space of real and virtual environment in accordance with an embodiment of the present invention.

The system for tutoring in the convergence space having the aforementioned configuration describes the process of providing a tutoring service with reference to FIG. 3.

FIG. 3 is a conceptual diagram for describing a method for providing a tutoring service in a convergence space of real and virtual environment in accordance with an embodiment of the present invention.

As illustrated in FIG. 3, the character data processing unit 152 first receives the character image data generated from the character image input device 110 to virtualize a character that is a real object, thereby performing character image virtualization generating the three-dimensional shape data of the character and the operation data of the character in step S300.

In addition, the desk data processing unit 154 analyzes the desk image data generated from the desk image input device 120 and separates the teaching materials put on the desk from several shapes in addition to the written contents to generate the desk shape data, thereby processing the desk image in step S302.

Further, the voice/sound data processing unit 156 receives the voice/sound data generated from the character and the shapes of the desk through the voice/sound input device 130 in step S304.

Then, the virtual space processing unit 158 composites the three-dimensional shape data, the operation data of the character, the desk shape data, and the voice/sound data that are generated through each step to generate the collected virtualized real space data and then, supplement and process the generated data and transmit the supplemented and processed data to the opponent's terminal device in step S306.

Further, when the opponent's virtualized real space data is received through the data transmitting and receiving unit 160 in step S308, the virtual space processing unit 158 receives the opponent's virtualized real space data and its own virtualized real space data that are received from the opponent's terminal device to generate the convergence space data in step S310.

Next, the virtual space processing unit 158 extracts the three-dimensional character shape data, the character operation data, the desk shape data, and the voice/sound output data that are required to reconfigure its own real environment from the convergence space in step S312 and then, provide the extracted data to the character data processing unit 152, the desk data processing unit 154, and the voice/sound data processing unit 156.

Therefore, the terminal device 150 uses the character data processing unit 152 and the desk data processing unit 154 to perform the rendering on the character shape and the desk shape and uses the voice/sound data processing unit 156 to output the voice/sound to the convergence space, thereby configuring the real and virtual space in step S314. That is, the character data processing unit 152 renders the character image by receiving the three-dimensional character shape data and the character operation data and generates the character image rendering data to be transmitted to the character image output device 112 and the desk data processing unit 154 receives the desk shape data to generate the desk image rendering data to be transmitted to the desk image output device 122. As described above, the generated character image rendering data and desk image rendering data is output through the character image output device 112 and the desk image output device 122.

Further, the voice/sound data processing unit 156 outputs the voice/sound data through the voice/sound output device 132.

The embodiments of the present invention can transform the virtualized tutor into an entertainer or other characters and enable the transformed entertainer or character to perform the guidance of learning to improve the satisfaction of a learner and implement the direct interaction by performing operations such as taking a note on the real teaching materials in the convergence space, deforming or replacing the real teaching materials, or the like, thereby increasing the immersion in the learner.

The embodiments of the present invention can perform the science experiment having a large risk using a safe wood tool but shows the wood tool like the actual tool, thereby increasing the tutoring efficiency while providing safety and reality and save the cost of the tutor and the learner by using simpler and more expensive equipment that is not attached to a user's body, so as to prevent a use of expensive equipment and equipment attached to a user increasing the user's fatigue that are main disadvantages of a the tutoring method using the virtual reality and augmented reality technology in accordance with the related art.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for tutoring using a convergence space, the method comprising:
generating tutor image data from an image of a tutor in a first real space and generating character shape and operation data of a tutor by capturing a character image of the tutor;
generating participant image data from an image of a participant in a second real space and generating voice or sound data based on voice or sound generated in a tutoring environment;

generating real space data virtualized by using the character shape data and the voice or sound data and providing the generated real space data to the participant through a communication network;
providing the tutor image data and the participant image data to the convergence space;
generating tutor object data from a first real object in the first real space;
generating participant object data from a second real object in the second real space;
providing the tutor object data and the participant object data to the convergence space;
providing convergence space data to the tutor and the participant, the convergence space data including convergence object data which comprises the first real object data and the second real object data;
detecting an alteration to the first real object by the tutor;
updating the convergence object data based on the alteration to the first real object by the tutor; and
synchronizing the second object with the first object by projecting a first altered object image based on the convergence object data onto the second real object using a projector,
wherein a three-dimensional character shape generated by applying a structured from motion method to the character image and three-dimensional operation data is generated by analyzing object deformation configured from the changing three-dimensional shape, wherein the character shape and operation data are transformed by referring to a character selected or preferred by the participant.

2. The method of claim 1, further comprising:
detecting an alteration by the participant to the second real object with the first altered object image projected thereon;
generating a second altered object image based on the alteration to the second real object with the first altered object image projected thereon; and
projecting the second altered image onto the first real object.

3. The method of claim 1, further comprising:
synchronizing the first real object with the second real object by projecting a synchronized object image onto each of the first and second real objects.

4. The method of claim 1, wherein the alteration to the first real object is writing.

5. The method of claim 1, wherein the participant image data is captured by a first camera focused on the participant, and the participant object data is captured by a second camera focused on the participant object.

6. The method of claim 5, wherein projecting the first altered object image based on the convergence object data onto the second real object is performed by a participant projector that is synchronized with a tutor projector.

7. The method of claim 1, further comprising:
capturing voice and sound information from the tutor; and
providing the voice and sound information captured from the tutor to the participant.

8. The method of claim 1, wherein the convergence space data includes desk data.

9. The method of claim 1, further comprising:
capturing motion data of sign language expressed by the participant;
converting the motion data of sign language into speech information; and
providing the speech information to the tutor.

10. The method of claim 1, further comprising:
transforming an image of the tutor provided to the participant in the second real space based on a selection of the participant.

11. A method for tutoring using a convergence space, the method comprising:
generating tutor image data including shape and motion data from an image of a tutor in a first real space;
generating participant image data from an image of a participant in a second real space;
generating voice or sound data based on voices or sounds in the second real space; generating real space data virtualized by using the tutor image data and the voice or sound data and providing the real space data to the participant through a communication network;
providing the tutor image data and the participant image data to the convergence space;
generating tutor object data from a first real object in the first real space;
generating participant object data from a second real object in the second real space;
providing the tutor object data and the participant object data to the convergence space;
providing convergence space data to the tutor and the participant, the convergence space data including convergence object data which comprises the first real object data and the second real object data;
detecting an alteration to the first real object by the tutor;
generating three-dimensional object data based on the alteration;
updating the convergence object data based on the alteration to the first real object by the tutor;
synchronizing the second object with the first object by projecting an altered object image based on the three-dimensional object data onto the second real object using a projector; and
applying a structured from motion process to the tutor image data received by the participant,
wherein a character image selected or preferred by the participant is animated with the tutor image data processed by the structured from motion process.

12. The method of claim 11, wherein a shape of the first real object is the same as a shape of the second real object.

13. A method for tutoring using a convergence space, the method comprising: generating tutor image data from an image of a tutor in a first real space;
generating participant image data from an image of a participant in a second real space;
providing the tutor image data and the participant image data to the convergence space;
generating tutor object data from a first real object in the first real space;
generating participant object data from a second real object in the second real space;
providing the tutor object data and the participant object data to the convergence space;
providing convergence space data to the tutor and the participant, the convergence space data including convergence object data which comprises the first real object data and the second real object data;
detecting an alteration to the first real object by the tutor;
updating the convergence object data based on the alteration to the first real object by the tutor; and
synchronizing the second object with the first object by projecting a first altered object image based on the convergence object data onto the second real object using a projector.

14. The method of claim 13, wherein a shape of the first real object is the same as a shape of the second real object.

* * * * *